United States Patent [19]
Coleman

[11] Patent Number: 5,469,809
[45] Date of Patent: Nov. 28, 1995

[54] NON DUSTING CLUMPING ANIMAL LITTER

[75] Inventor: Douglas Coleman, Macon, Miss.

[73] Assignee: Super Dry Industries, Inc., Shaqualak, Miss.

[21] Appl. No.: 275,803

[22] Filed: Jul. 15, 1994

[51] Int. Cl.⁶ ................................................. A01K 29/00
[52] U.S. Cl. ................................................. 119/173
[58] Field of Search ............................... 119/171, 172, 119/173

[56] References Cited

U.S. PATENT DOCUMENTS

| | | | |
|---|---|---|---|
| 4,459,368 | 7/1984 | Jaffee et al. | 502/80 |
| 4,591,581 | 5/1986 | Crampton | 502/407 |
| 4,704,989 | 11/1987 | Rosenfeld | 119/1 |
| 5,101,771 | 4/1992 | Goss | 119/173 |
| 5,129,365 | 7/1992 | Hughes | 119/173 |
| 5,188,064 | 2/1993 | House | 119/172 |
| 5,207,830 | 5/1993 | Cowan et al. | 119/171 |
| 5,325,816 | 7/1994 | Patteng-Illetrc | 119/173 |

Primary Examiner—Gene Mancene
Assistant Examiner—Thomas Price

[57] ABSTRACT

A process of creating cat litter which comprises forming a mixture of opal clay with one or more of the following three constituents:

sodium bentonite
calcium lignosulfonate
binder

The material is then mixed. The resulting mixed material is then pelletized in a disc pelletizer to form small round pellets. The resulting pellets are dried and then screened to produce a product having a fairly uniform pellet size averaging between a −6 and +30 mesh while removing substantially all dust and small particles.

The resulting product forms a cat litter which has a clay base, yet is substantially dust-free and flushable. The litter will clump upon the absorption of liquids, such as cat urine and feces, allowing the trapped liquids and solids to be removed as a clumped ball for flushing or disposal.

9 Claims, 2 Drawing Sheets

PROCESS FLOW DIAGRAM

NON DUSTING CLUMPING ANIMAL LITTER

BACKGROUND OF THE INVENTION

This invention pertains to the field of animal litters, especially Cat Litter, a granular product used to receive and absorb animal wastes for subsequent disposal. Such materials have many existing problems. The earliest such materials were drawn from the field of spill adsorbing materials, such as had been widely used to adsorb oil and liquid spills. While such materials resembled sand or dirt, and thus were acceptable to the animal, representing an instinctive place to deposit and bury wastes (cats will not place wastes where they cannot be buried.), they only adsorbed and held urine. This decomposed, and became the source of odor, requiring frequent replacement and disposal of the litter.

Subsequent developments have concentrated on providing a method for disposing of both solid wastes and liquid wastes. This led to the development of clumping litters, in the form of finely ground granules of certain clays, sometimes augmented by binders or additives. These granules clump in the presence of liquid wastes, which then can be scooped up and removed with the solid wastes.

However these fine granular clays present additional problems. The most irritating is that these materials produce continual dusts, both during manufacture and shipment, and as the litter is disturbed during use. Consumer surveys have indicated that the presence of dust is the most common complaint about cat litter, because of the cleanliness problem animal litter dust presents in a household environment. Further, the dust clings to the fur and paws of the cat, and is tracked throughout the home, or is ultimately ingested by the animal during grooming; both results are equally undesirable.

The composition and manufacture of these prior art litters are shown, for example, in the following:

U.S. Pat. No. 4,704,989 to Rosenfeld discloses a process for producing cat box litter which comprises taking a fine clay dust, disclosed as either predominantly kaolin or bentonite, wetting it with a mixture including an adhesive-type soluble lignin (obtained as a by-product from paper treatment) and then extruding the wet mixture through a pellet or pin type agglomerator. The resulting pellets are screened and then dried to be not more than 29% by weight water and preferably 5% by weight water to create an absorbing clay litter.

U.S. Pat. No. 4,459,368 to Jaffee and others discloses the use of a combination of Fuller's earth, preferably in the form of calcium bentonite, mixed with calcium sulfite dihydrate. In this patent, both the clay and the calcium sulfate dihydrate (synthetic granules) are individually screened to a desirable particle size, an example being 6 mesh, and then are mixed as particles to form a mixture which is then the claimed cat litter.

EUROPEAN PATENT 424001A1 to Hughes discloses an animal waste absorbent formed of water-expandable bentonite clay originally provided in discreet particles of between 50 and 3350 microns. This material is claimed to form clumps, after one to twenty-four hours exposure to liquid animal waste, which can be easily removed. The clumps are not physically bound and will dissolve in water but are physically stable enough to be removed from the remaining powder.

U.S. Pat. No. 5,129,365 to Hughes is the U.S. Patent corresponding to the European patent discussed above.

U.S. Pat. No. 5,188,064 to House claims a clumping cat litter comprising a mixture of a clumping clay such as shown in the Hughes' patent, together with cellulose and a material such as a non-swelling clay to adjust the density of the resulting cat litter. The mixture is provided as a mixed powder of the various ingredients, sized typically within the range of two hundred fifty microns to 2000 microns for both the clays and the cellulose.

U.S. Pat. No. 5,101,771 to Goss discloses a clumping animal litter made of free-flowing clay particles coated with an organic biodegradable clumping agent suspended in an oil-like vehicle and distributed over the surface of the clay particles. This patent differs from the prior patents in that the principle clay component is chosen those clays considered not suitable for use in the House and Hughes patents. The clay particles are themselves screened particles stated to be between a 4 and 60 mesh, preferably 20 to 60 mesh. The particles are then coated with the clumping agent, preferably a cellulosic ether such as methyl cellulose, carboxymethyl cellulose or hydroxypropylmethylcellulose. The clumping agent and an oil mixture are sprayed upon the clay particles.

U.S. Pat. No. 4,591,581 to Crampton and others discloses a process for making absorbent clay mineral particles: mixing the dried particles with up to 5% by weight of a water-dispersed colloid; compacting the material in a press; and then breaking the compacted material into masses of smaller particles. The material is disclosed as useful for a litter. The suggested colloid is a vegetable gum such as guar gum or derivatives. These colloids are described as particularly enhancing the clumping properties of the litter. The process disclosed mixes the clay fines with a water-dispersed additive having such colloidal properties, disclosed types including a silicate, a pyrophosphate, or a polysaccharide. The amount of the colloidal agent is limited to 5% or less by weight to the clay. The clay mixture is compacted in a roll mill and then broken into smaller particles to form a particulate litter.

U.S. Pat. No. 5,193,489 to Hardin discloses that the clumping ability of a poorly clumping clay may be enhanced for use as a litter by mixing the clay with a water-soluble or dispersed gum such as a guar gum or derivatives. This patent includes the disclosure that a polysaccharide may be used as one of the agglomerating gums.

SUMMARY OF THE INVENTION

The Invention is a improved clay based litter which avoids the dust generating properties of the prior art, while retaining the desirable clumping characteristics of current cat litters. The invention includes the method of forming the litter.

The improved litter is formed in the form of a relatively smooth, spherical diameter, screened, small round balls. By screening the litter, a smooth, spherical size ball is produced; by forming the clay litter as round balls, almost all tendency of the litter to abrade, forming dusts, is eliminated. It is part of the invention that the inventor has found that the irregular shape of prior art cat litters is a principal source of dust, and the particles abrade each other during shipment, movement and use.

It is a further part of the invention that the density of the litter is reduced, and is lighter than most prior art non-tracking clay litters, providing a more efficient liquid absorbent by weight.

The invention in process form is a process of creating cat litter which comprises forming a mixture of opal clay with one or more of the following three additional constituents:
- sodium bentonite
- calcium lignosulfonate
- binder The mixed material is then pelletized or mixed in a disc pelletizer to form small round clay pellets. The resulting pellets are dried and then screened to produce a product having a fairly uniform pellet size averaging between a –6 to +30 mesh while removing substantially all dust and small particles.

The resulting product forms a cat litter which has a clay base, yet is substantially dust-free and flushable. The additional ingredients enhance the tendency of the litter to clump upon the absorption of liquids, such as cat urine and feces, allowing the trapped waste to be removed as a clumped ball for flushing or disposal.

DETAILED DESCRIPTION OF THE INVENTION

Figure 1:
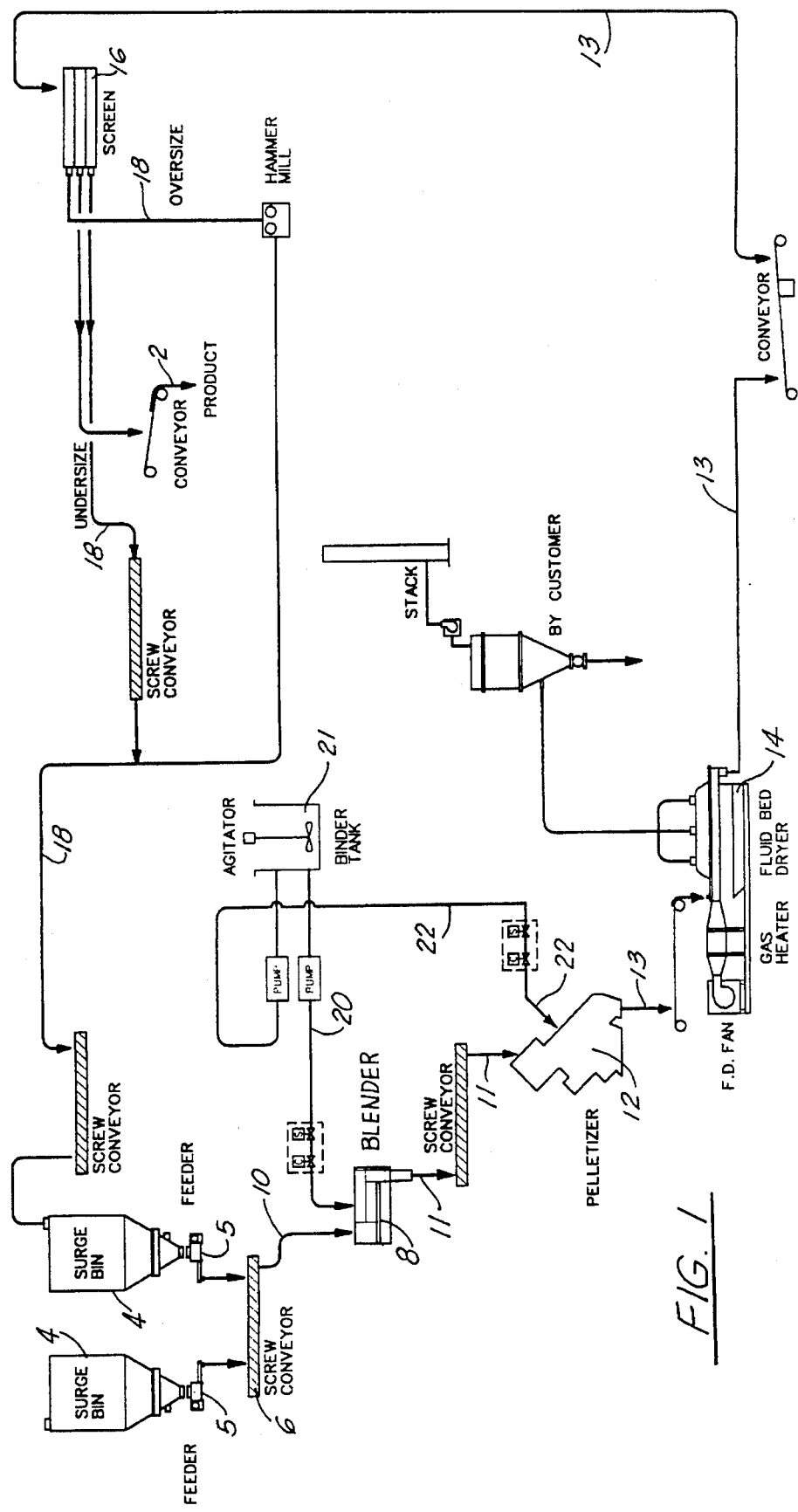
FIG. 1 is a flow diagram of the process of the invention.
Figure 2:
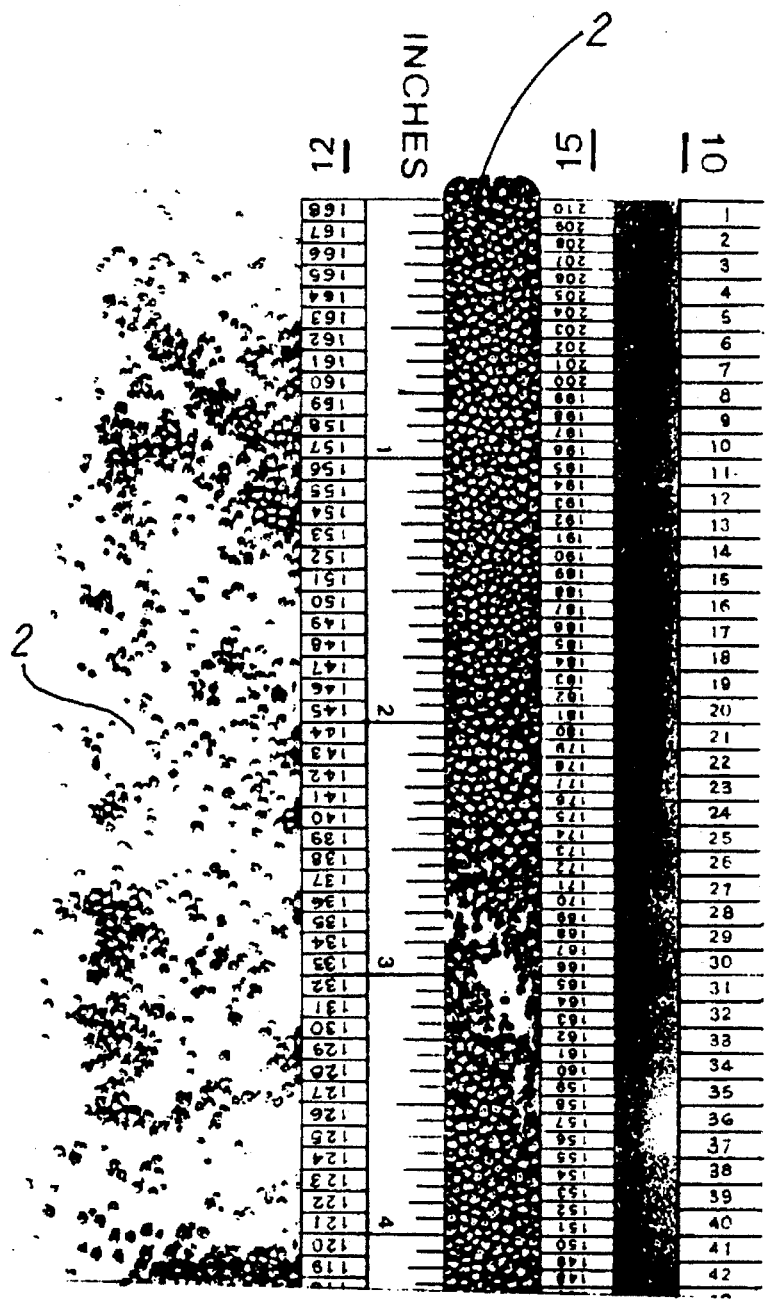
FIG. 2 depicts the litter of the invention in enlarged size.

The described process is necessary to understand the inventive product, which insofar as the inventor is aware, may only be made by the process.

Clearly the most important feature of a successful animal litter is that it is absorbent. Vermiculite, a standard moisture absorbent, is too light (insufficiently dense) to make a successful animal litter as it is too easily displaced and tracked throughout the house by the actions of the animal. A survey of 1000 cat owners by the Advisory Council of Cat Lovers Association of America, the publisher of "Cat Fanciers" magazine, indicates that the two most important characteristics of an animal litter is that there be little or no dust in the litter, and that the litter not be tracked by the animal. This latter requirement is equivalent to minimizing adhesion of the litter particles to cat fur or feet.

As is known various litters for absorption or receipt of animal wastes, are made from certain natural clays which have beneficial clumping properties in the presence of moisture. Such clays are predominantly sodium bentonite and atapulgite clays. These clays combine absorption with clumping tendencies in the presence of moisture. However these litters are rough edged, irregular shaped particles, and break down from the friction of movement in transit, in storage, and in use, forming fine powders or dusts which spread in the air, and which further stick to the animal's fur and feet.

Typical processing of clays to form litter usually compresses the clay. Thus a test mixture of opal clay and starch, when processed into a litter with a pin mixer, such as the Ferro Tech Turbulator™, has a density of 55.1 pounds per cubic foot. This test mixture, of opal clay with starch additive, has an unprocessed density of 30.8 pounds per cubic foot. The prior art has considered these higher density litters beneficial to prevent tracking of the litter by the animal's paws and fur.

The inventive litter 2 is a clay mixture with optional addition of a binder, in the form of substantially round smooth particles 2 having a lower density than prior art non-tracking litters and has significantly reduced dust generation. The round shape is believed to substantially reduce or eliminate the generation of powder fines or dusts in storage and shipment. The particles additionally have little adhesion to a cat's fur or feet, primarily due to their round shape and relatively smooth surface. They thus reduce tracking even though they are less dense than has previously been believed desirable to prevent tracking. Nevertheless, the particles retain the beneficial clumping characteristics of clay based clumping litters. The lessened density also means that the inventive litter 2, on an equal weight basis, is more absorbent, and the customer receives a greater volume of litter than with other non-tracking products presently available (litter is sold universally on a weight basis).

The inventive litter resists crushing in shipment, storage or use. It does not form powder fines or dusts.

The inventive litter is produced from a mixture of opal clay, a clay found in central Mississippi. This clay is mixed with Sodium Bentonite (it is known that calcium bentonite clays do not clump, and are thus less suited for use in making clumping cat litters; sodium bentonite will clump in the presence of water.) Typically, the mixture ranges from ninety percent to fifty percent Opal clay by weight; ten percent to fifty percent sodium bentonite, from zero to ten percent calcium lignosulfonate to modify density and hardness; optionally zero to five percent binder, such as FFS Binder System 29137, available from Flavor and Fragrance Specialties of Franklin Lakes, N.J.; and optionally about one half percent (0.5%) polymer surfacing agent such as Flavor and Fragrance Specialties' DeDuster 90-24277™ polymer. Optionally, trace additives for ammonia and odor control can be used. The proportions chosen from the ranges specified are such that the total of the opal clay, the Sodium Bentonite and the Lignosulfonate is about ninety nine percent by weight of the entire mixture.

Two example mixtures are, first, a mixture of opal clay with additionally twenty five percent by weight sodium bentonite, and eight percent by weight calcium lignosulfonate as a hardener. A second mixture is opal clay with additionally twenty five percent by weight sodium bentonite, three percent by weight calcium lignosulfonate, and four percent by weight binder. Either mixture can additionally comprise about one half percent polymer surfacing agent.

The clays are provided in a powder form and fed from holding bins 4 through feeders 5, which maintain the desired proportions of the clays, to a screw conveyor 6, which feeds the clay mixture 10 into a blender 8. Blender 8 mechanically blends the clays to form a uniform mixture. The optional additives, comprising the lignosulfonate, the binder and the surfacing agent, are blended 21 to form a liquid 20,22. One part of the liquid additives 20 are added to the clay mixture 10 in the blender 8. This blended mixture 11 is then fed into a Disc Pelletizer 12, a machine which rolls the material together without significant compression of the mixture, to form round smooth pellets 13. The remaining liquid optional aditives 22 are directly applied in the disc pellitizer 12 to the mixture 11. A suitable disc pellitixer 12 is the Ferro-Tech Disc Pellitizer as described in the catalog of the Ferro Tech Company of Wayandotte, Mich.

Calcium lignosulfonate is not added to the inventive mixture 10 to create a clumping characteristic in the resulting litter 2, as with the prior art, which has used lignosulfonates in higher proportions to clays to enhance the clumping properties of cat litter in the presence of liquids. Rather, the smaller proportions of calcium lignosulfonate used in the invention helps form and maintain the smooth round shape in the resulting litter. It is used as a hardening agent to reduce dust and increase production.

Disc pelletizer 12 has been discovered by the inventor to form smooth round pellets 13 of clay based materials, but not to compress the clays. Thus the resulting pellets have a density as low as 39 pounds per cubic foot for a mixture of 25% sodium bentonite and 75% opal clay, which is considerably lighter than the typical 55.1 pounds per cubic foot of a pin mixed mixture of similar composition.

The output from the disc pellitizer 12 is in the form of round pellets 13 of varying sizes. The moisture content of the pellets 13 as formed from the disc pellitizer 12 is fifteen (15) to twenty (20) percent moisture. These pellets are then dried in a fluid bed dryer 14. The dried pellets are then screened in a standard mesh screener 16 to pass a 6 mesh screen but not to pass a 30 mesh screen. Both oversize and undersize particles are returned 18 for re-processing, thus reducing waste.

The resulting product is a nearly uniform −6 to +30 mesh size round smooth bead of some hardness. The tendency of the material to form dusts was tested by bagging samples of the inventive litter, and then handling bags of the inventive material and of prior art clay based cat litters so as to simulate equally the effects of shipment and storage. The materials were then screened, interpreting all materials which passed a 100 mesh screen as being dust. The inventive material showed less than one half percent dust (0.5%); the prior art materials generated from 1 to 5 percent dust under identical conditions.

The resulting litter is a perceptible small bead 2, visually similar to a fine bird shot, in comparison to the prior art clumping litters, which resemble fine granules; the clumping ability and absorbance of the inventive material are unimpaired. The inventive litter still forms absorbent clumps in the presence of liquid, such as animal urine and feces, and the clumps are easily removed form the litter or disposal.

Opal clay, as used in this specification, makes reference to a clay known as opaline silica or opal-ct.

The invention is thus a novel physical form of cat litter, and a novel process of producing the inventive litter. The litter is lighter than most non-tracking litters, more absorbent, and substantially dust and tracking free in use, while retaining the desirable clumping properties of prior art clay litters. The invention therefore extends to those physical equivalents of the claimed litter.

I claim:

1. A cat litter comprising:

a mixture comprising opal clay and sodium bentonite;

said mixture being pelletized into substantially round pellets;

said pellets being between a six (6) mesh and thirty (30) mesh in size.

2. The litter of claim 1 further comprising:

lignosulfonate in a quantity sufficient to harden the pellets.

3. The litter of claim 2, said lignosulfonate being less than 10 percent by weight of the mixture.

4. The litter of claim 1, comprising between ninety percent to fifty percent opal clay by weight;

between ten percent to fifty percent sodium bentonite by weight;

ten percent or less calcium lignosulfonate by weight.

5. The litter of claim 4 further comprising:

five percent or less binder by weight.

6. The litter of claim 4 further comprising:

about one half percent polymer surfacing agent by weight.

7. The litter of claim 1 comprising:

twenty five percent by weight sodium bentonite;

eight percent by weight calcium lignosulfonate;

sixty seven percent by weight opal clay.

8. The litter of claim 1 comprising:

twenty five percent by weight sodium bentonite;

three percent by weight calcium lignosulfonate;

four percent by weight binder; and the remainder by weight opal clay.

9. A process for making cat litter comprising:

forming a mixture comprising particulate opal clay and sodium bentonite;

pelletizing said mixture in a disc pelletizer to form substantially spherical pellets;

screening said pellets to select pellets which pass a 6 mesh screen but are retained on a thirty mesh screen;

said selected pellets comprising the litter.

* * * * *